United States Patent [19]

Kashio

[11] 3,909,783

[45] Sept. 30, 1975

[54] CODED INFORMATION SIGNAL FORMING APPARATUS

[75] Inventor: Toshio Kashio, Tokyo, Japan

[73] Assignee: Casio Computer Co., Ltd., Higashiyamato, Japan

[22] Filed: Apr. 5, 1974

[21] Appl. No.: 458,307

[30] Foreign Application Priority Data

Apr. 9, 1973 Japan .............................. 48-40232

[52] U.S. Cl. ........................................ 340/146.1 AG
[51] Int. Cl.[2] ........................................ H04L 1/10
[58] Field of Search .......................... 340/146.1 AG

[56] References Cited

UNITED STATES PATENTS 3,466,602 9/1969 Moser et al. .............. 340/146.1 AG

*Primary Examiner*—R. Stephen Dildine, Jr.
*Attorney, Agent, or Firm*—Flynn & Frishauf

[57] ABSTRACT

A coded information signal forming apparatus comprising a judgement circuit for judging whether the total number of bits of "1" or "0" constituting binary-coded unit of information defined by a division code is odd or even; and means for inverting to 1 the polarity of the least significant bit of a division code immediately following said unit of information in the case where said total bit number is odd, whereby a coded information signal suitable for checking the presence of bit errors in said unit of information can be detected.

3 Claims, 3 Drawing Figures

| | A | B | C | SI | SII |
|---|---|---|---|---|---|
| I | 1 | 1 | 1 | 1 | 1 |
| II | 1 | 0 | 0 | 1 | 1 |
| III | 0 | 1 | 0 | 1 | 1 |
| IV | 0 | 1 | 0 | 1 | 1 |
| V | 0 | 0 | 1 | 1 | 1 |
| VI | 0 | 0 | 0 | 1 | 1 |
| VII | 1 | 0 | 0 | 1 | 1 |
| VIII | 1 | 0 | 0 | 0 | 1 |

CODED INFORMATION SIGNAL FORMING APPARATUS

BACKGROUND OF THE INVENTION

This invention relates to a coded information signal forming apparatus capable of effectively detecting the presence of bit errors in binary-coded information defined by a division code for each unit of information consisting of a plurality of characters, without increasing the number of bits.

Where transmission of various information contents is effected, it is customarily prevailing to binary-code such information signals by bit signals of 1 or 0. That is to say, since information signals are all converted into 1 or 0 bit signals, signal transmission characteristics are not only improved but signal processing can effectively be performed when information signal transmission is effected or when a storage operation following recording and displaying operations is carried out.

Where, however, information transmission is conducted by the use of the above-mentioned bit signals, entry of noise signals into signal transmission paths, or loss of, for example, one of the bit signals, undesirably causes such bit signals to become signals representing different information contents from those to be transmitted. For this reason, it is necessary always to judge whether or not coded bit signals are being transmitted with precision.

In view of the above-mentioned circumstances, the object of this invention is to provide a coded information signal forming apparatus designed to minimize detection signals and, under this condition, capable of always detecting by simple means whether or not bit signals are being precisely transmitted, thereby enabling the signal transmission system to be always effectively supervised.

SUMMARY OF THE INVENTION

According to the present invention, a coded information signal forming apparatus which, in a transmission device using a binary-coded information content defined by a division code for each unit of information each unit of information including a plurality of characters, comprises judgement means for judging whether the total number of bits of 1 or 0 contained in a binary code constituting each of said plurality of characters in said unit of information is odd or even, and means for inverting the polarity of at least one specified bit of said division code in response to an odd judgement signal or an even judgement signal obtained from said judgement means, whereby a coded information signal suitable for checking the presence of bit errors in said unit information can be detected.

DETAILED DESCRIPTION OF THE INVENTION

Figures 1, 2, 3:
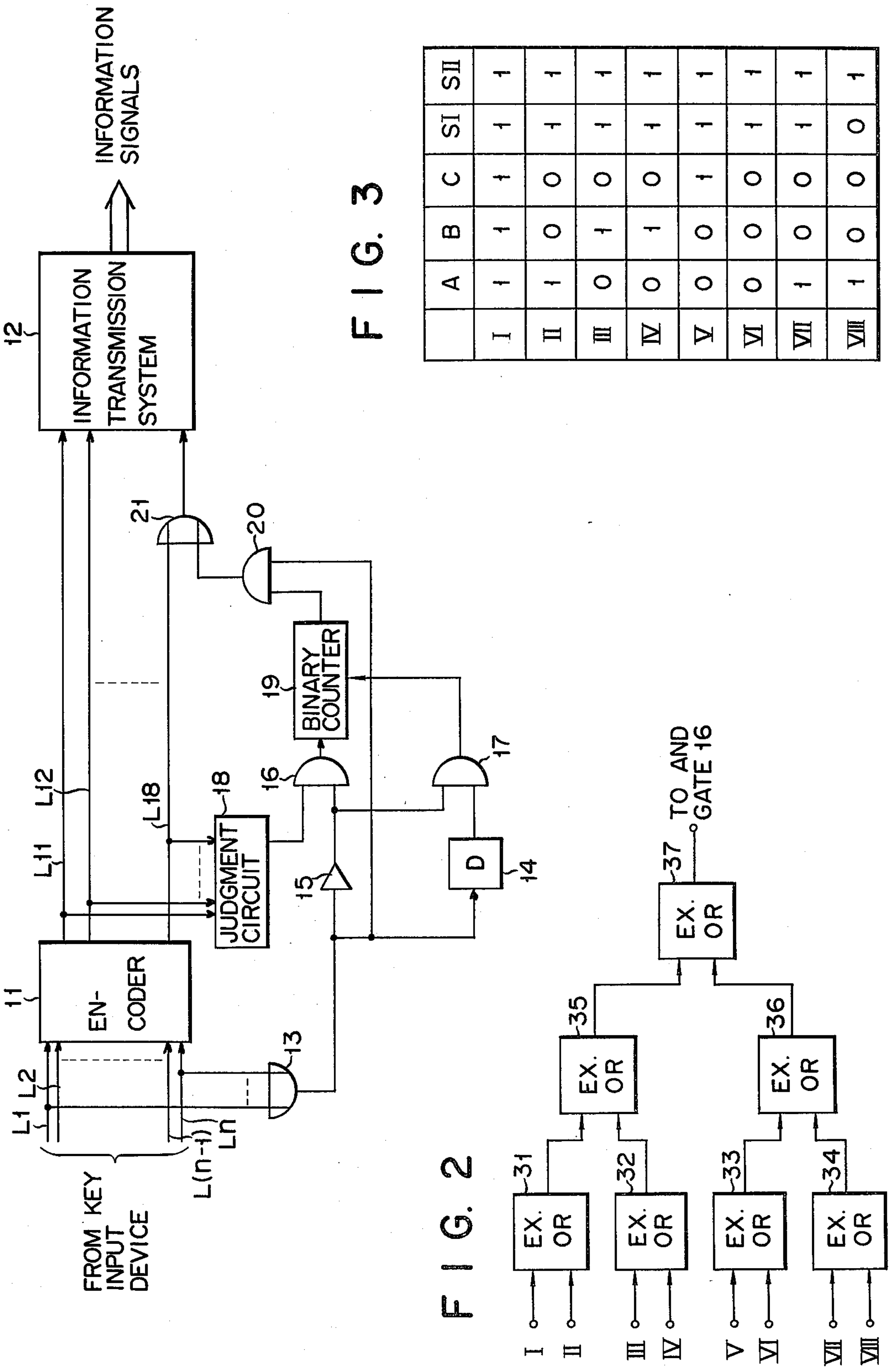
FIG. 1 is a block circuit diagram showing a coded information signal forming apparatus according to an embodiment of the invention.
FIG. 2 is a block circuit diagram showing a concrete example of a judgement circuit shown in FIG. 1.
FIG. 3 is a table illustrating the bit construction of a character information item or specific information item applied to input terminals I to VIII of FIG. 2.

Information items obtained in response to character, figure, mark or space key operations are fed via signal lines L1, L2, . . . L($n$−1) and Ln from, for example, a key input device not shown to an encoder 11. Said information items are defined by division code signals for each unit information consisting of plural characters and are fed into the encoder 11 in a grouped form. For example, characters A, B and C constituting one word, and the immediately following specific information items other than printing information, such as space signal SI, tab signal S2 or return signal S3 constitute a set or group of information items. Input information items are converted by said encoder 11 into coded signals each consisting of, for example, 8 bits and each bit signal is drawn out at output lines L11, L12, . . . L18 respectively. Said signals of 8 bits are supplied to an information transmission system 12 including, for example, a memory device, thereby to obtain output signals for information transmission. Specific information input signals such as, for example, space signals from the key input device are collectively coupled to an OR circuit 13. For example, a space signal SI is obtained via the OR circuit 13 from the line L1 and coupled to a delay circuit 14. Further, the output terminal of the OR circuit 13 is connected via an inverter 15 with one input terminal of each of AND circuits 16 and 17, and an output signal from said delay circuit 14 is coupled to the other input terminal of the AND circuit 17. To the other terminal of AND circuit 16 is coupled an odd number judging output signal from an odd or even number judgement circuit 18. An output signal from said AND circuit 16 is supplied as a counting signal to a binary counter 19. In this case, said judgement circuit 18 is designed to count for judgement of a 1 or 0 bit signal of an 8 bit output signal produced via the eight output lines L11, L12, . . . L18 from the encoder 11 while the binary counter 19 is so constructed as to be reset by an output signal from the AND circuit 17. An output signal from said binary counter 19 is coupled, via an AND circuit 20 whose gate is enabled by a specific information input signal from the OR circuit 13, to one input terminal of an OR circuit 21, the other input terminal of which is connected with the eighth output line L18 of the encoder 11 which is used for transmission of the eighth bit signal. The judgement circuit 18 can be constructed using seven exclusive OR gates 31, 32, 33, 34, 35, 36 and 37 as shown in FIG. 2. The input terminals I and II of the exclusive OR gate 31 are respectively connected with the lines L11 and L12, the input terminals III and IV of the gate 32 with the lines L13 and L14, the input terminals V and VI of the gate 33 with the lines L15 and L16, and the input terminals VII and VIII of the gate 34 with the lines L17 and L18. The output terminals of the exclusive OR gates 31 and 32 are connected with the input terminals of the gate 35, the output terminals of the gates 33 and 34 with the input terminals of the gate 36, the output terminals of the gates 35 and 36 with the input terminals of the gate 37, and the output terminal of the gate 37 with said other input terminal of the AND gate 16.

For example, when, as shown in FIG. 3, bit signals of a binary code (11000011) corresponding to a character A are supplied to the respective input terminals I to VIII of FIG. 2, the respective outputs of the exclusive OR gates 31 to 34 become 0, 0, 0 and 0, and the respective outputs of the gates 35 and 36 become 0 and 0, so that a 0 signal appears at the output terminal of the gate 37. Further, when a binary code (10110000) corresponding to a character B is supplied, the respective outputs of the gates 31 to 34 become 1, 0, 0 and 0, and the respective outputs of the gates 35 and 36 become 1 and 0, so that a 1 signal appears at the output terminal of the gate 37. Similarly, when a binary code (10001000) corresponding to a character C is supplied, the respective outputs of the gates 31 to 34 become 1, 0, 1 and 0, and the respective outputs of the gates 35 and 36 become 1 and 1, so that a 0 signal appears at the output terminal of the gate 37. As described above, when the number of 1 signals of the 8 bit code signals supplied to the judgement circuit 18 is even, the judgement circuit 18 is designed to supply an output 0 to said other input terminal of the AND gate 16. When, on the other hand, the number of said 1 signals is odd, the judgement circuit 18 is designed to supply an output 1 to the input terminal of the AND gate 16.

In the above-constructed apparatus, the information signal from the key input device is converted into an 8 bit binary-coded signal by the encoder 11 and then supplied to the information transmission system 12, thereby effecting the transmission of information. In this case, a division code signal such as a space information coded signal obtained from the encoder 11 is so constructed as to cause its eighth bit or least significant bit to be rendered 0, and arrangement is so made that whether the eighth bit is 0 or 1, the coded signal is handled as a space information signal. Namely, both codes SI and SII of FIG. 3 are used as space information.

When the key input operations are carried out as described above and as the result a coded information signal is obtained from the encoder 11, the judgement circuit 18 detects the number of those bits of the information output which have become 1, and when an odd number of said 1 bits are detected, a signal 1 is supplied to the AND circuit 16. When, in this case, a space information input SI is absent, the odd number judgement signal supplied to the AND circuit 16 is supplied as a counting signal to the binary counter 19, the output of which is step-advanced for inversion each time the odd number judgement is made. That is, the binary counter 19 is so set as to produce an output 1 upon one odd number judgment and to produce an output 0 upon two odd number judgements, and is designed from its count starting time to produce an output 1 when the total number of the bits of the output signal 1 from the encoder 11 is odd and to produce an output 0 when said total number of 1 bits is even. Since, when information items consist of characters A, B and C, the judgement circuit 18 produces 0, 1 and 0 in order, the output from the binary counter 19 becomes 1. At this time, the eighth bit of the encoder 11 becomes 1 to couple the space code SII (11111111) of FIG. 3 to the information transmission system 12. In this case, when a space information input has been detected by the OR circuit 13, the binary counter 19 is reset by the output of the AND gate 17 enabled by the respective outputs of the delay circuit 14 and inverter 15, namely, by the output of the AND gate 17 after transmission of space information. For this reason, when the total number of 1 bits of a coded information signal representing the extent, i.e., one word defined by space information, is odd, a 1 signal is obtained from the binary counter 19, and, via the AND circuit 20 which is enabled when the circuit 20 is supplied with the immediately following space information, the eighth bit of the space information code at that time is inverted into 1.

The eighth bit of a space information coded signal of a signal representing information to be transmitted is in either state of 1 and 0. Where said eighth bit is in a state of, for example, 1, this indicates that the total number of bits 1 of a word signal immediately preceding its space information coded signal is odd. Whether or not the total number of bits 1 of a coded information signal representing the extent, i.e., one word defined by a specific information signal, for example, a space signal is odd is collated with whether or not the eighth bit of the immediately following specific information coded signal is 1, thereby detecting whether or not information transmission is effected with precision.

The preceding embodiment referred to the case where the number of those bits 1 of an information coded signal is counted for judgement, but it is apparent that the number of bits 0 may be counted for judgement. Further, the preceding embodiment referred to the case where the nth bit of a specific information coded signal is 1 when the number of counted bits 1 is odd, but it is also apparent that said nth bit may be 1 when said counted bit number is even. Further, the preceding embodiment referred to the case where the eighth bit of a specific information code signal from the encoder subjected to inversion in accordance with the resultant odd or even number is normally 0 and rendered 1 by subjecting said 0 to odd or even number judgement, but it is also apparent that the reverse processing provides the same result. Further, it is also not necessary in particular that a bit whose polarity is to be inverted is the least significant bit of a coded signal from the encoder. The point is that one of two coded signals representing the same information coded signals has only to be alternatively chosen in accordance with the resultant odd or even number. Further, specific information signals are not limited to space or tab set signals but may of course be particular division information signals intended for detection.

As above described, this invention makes it possible to detect as required in a simple manner whether or not information transmission is effected with precision, without increasing detection bits in number and only by judging whether the specified bit of a specific information coded signal is 1 or 0 and counting the total number of 1 or 0 bits of an information code defined by specific information, thus presenting an extremely prominent effect in performing the exact processing of information. That is, this invention enables an extremely efficient control of, for example, information transmission and operations in various types of calculation processing devices as well as an extremely efficient control of transmission of information to a far remote region.

What is claimed is:

1. A coded information signal forming apparatus which, in a transmission device using binary-coded information defined by a division code signal for each unit of information, each unit of information including a plurality of characters, comprising:

judgement means for determining whether the total number of bits of 1 or 0 of a binary code representing each of said plurality of characters in said unit of information is odd or even and for generating respective odd and even judgement signals as a result of said determination; and means coupled to said judgement means for inverting the polarity of at least one specified bit of said division code signal in response to one of said odd judgement signal and said even judgement signal obtained from said judgement means, whereby a coded information signal suitable for checking the presence of bit errors in said unit information can be formed.

2. A coded information signal forming apparatus according to claim 1 wherein said polarity inverting means includes a binary counter for counting the number of outputs from said judgement means, and means responsive to the output of said binary counter for inverting the polarity of the specified bit of said division code.

3. A coded information signal forming apparatus according to claim 1 wherein:

said judgement means generates a 1 output signal when the total number of 1 bits of a binary code signal representing the character is odd; and said polarity inverting means includes an OR circuit for obtaining an output upon detection of said division code; an inverter connected to receive the output of said OR circuit; a delay circuit for delaying the output of said OR circuit; a first AND circuit having a first input terminal supplied with the output signal of said judgement means and a second input terminal supplied with the output signal of said inverter; a second AND circuit having input terminals respectively connected to the outputs of said inverter and delay circuit; a binary counter for counting the number of outputs from said first AND circuit and having a reset terminal connected to the output of said second AND circuit; and a third AND circuit supplied with the respective outputs of said OR circuit and binary counter.

* * * * *